United States Patent [19]

Chavous

[11] Patent Number: 5,161,180
[45] Date of Patent: Nov. 3, 1992

[54] CALL INTERCEPTOR FOR EMERGENCY SYSTEMS

[76] Inventor: Robert O. Chavous, 9 Orlando Dr., Chattanooga, Tenn. 37415

[21] Appl. No.: 600,433

[22] Filed: Oct. 19, 1990

[51] Int. Cl.⁵ .................... H04M 11/04; H04M 1/57; H04Q 3/72; G08B 26/00
[52] U.S. Cl. ........................................ 379/45; 379/40; 379/50; 379/88; 379/127; 379/198; 379/234; 379/246
[58] Field of Search .................. 379/127, 245, 246, 38, 379/45, 37, 39, 40, 41, 42, 43, 219, 247

[56] References Cited

U.S. PATENT DOCUMENTS

| | | | |
|---|---|---|---|
| 3,904,830 | 9/1975 | Every, Sr. et al. | 379/247 |
| 3,967,073 | 6/1976 | Anderson et al. | 379/127 |
| 4,578,540 | 3/1986 | Borg et al. | 379/40 |
| 4,839,917 | 6/1989 | Oliver | 379/45 |
| 4,893,325 | 1/1990 | Pankonen et al. | 379/45 |

Primary Examiner—James L. Dwyer
Assistant Examiner—Harry S. Hong
Attorney, Agent, or Firm—Pitts and Brittian

[57] ABSTRACT

A device for responsively providing, in cooperative association with the 911 emergency system, the number and location of a telephone, especially a PBX extension telephone, from which such a 911 emergency call originates. A first device is installed between PBXs and the extensions thereof, with the number and location of each extension stored in the device's electronic memory. A second such device is installed at a Public Safety Answering Point. When 911 is dialed from an extension telephone of a PBX equipped with a device of the present invention, even if the extension receiver is still on-hook, the extension is connected over telephone lines to the second device installed at the PSAP. The device at the PSAP then interrogates the device at the PBX which responsively transmits the location of the extension telephone from which the call originated. The device installed at the PSAP relays the location information to at least one computer which informs an operator of the location of the calling phone. The Public Safety Answering Point operator is then able to dispatch assistance to the person placing the emergency call. Provision is made for automatically selecting an alternate route if no interrogating signal is detected.

15 Claims, 6 Drawing Sheets

CALL INTERCEPTOR FOR EMERGENCY SYSTEMS

TECHNICAL FIELD

This invention relates to systems and devices used in the telephone industry and more particularly concerns a device for automatically identifying, in cooperative association with the emergency 911 system, the number and location of a telephone, especially a PBX extension telephone, from which an emergency call originates.

BACKGROUND ART

Devices for automatically identifying (tracing) the number of a telephone from which a call originates do not comprise a new art, per se. Call tracing devices of various types have been in use for years by the telephone company. Prior to the present invention, however, these devices have been difficult to implement, slow in operation, and unreliable. These shortcomings, coupled with the advent of the 911 and Enhanced 911 emergency systems, have made it apparent that a need exists for a way to automatically and specifically identify any telephone within a specified geographic area from which a call is being made, especially extensions of Private Branch Exchanges (PBXs). This latter capability is particularly needed because, at the time of the present invention, all telephone trunk lines which connect the PBXs of multi-line entities such as universities, hospitals patent number, etc., to a Telephone Company's (TELCO) Central Office (CO) are identically labelled with only the primary number which has been assigned to the PBX of that institution. This means that all extensions of such a multi-line PBX are identified with the same phone number; no extension telephones can be individually identified. Thus, emergency personnel might be delayed for hours in locating the source of a call for help which originated at an extension telephone.

Furthermore, a need also exists for a means of quickly and reliably identifying the telephone numbers associated with other call originating telephones which are not associated with PBXs, including but not limited to "cordless" radio-telephones and cellular telephones, for instance.

Accordingly, it is a principal object of the present invention to provide a system which includes devices capable of being installed either at a called point, such as the Public Safety Answering Point (PSAP), or a calling point, such as a PBX, or both, and which will automatically provide the number and location within a specified geographic area of a telephone from which a call is originating, especially including PBX extensions.

Throughout this Application, the term "PBX" will be used generically to represent the terms Private Branch Exchange, Private Automatic Branch Exchange, Centrex, Key System, Electronic Solid State eXchange, or commercial manufacturer's brands of telephone systems.

Known prior art pertaining to the present invention includes Letters Patent granted to Anderson, et al, U. S. Pat. No. 3,967,073, Pankonen, et al, U.S. Pat. No. 4,893,325, and Oliver, U.S. Pat. No. 4,839,917.

The device of Anderson et al, hereinafter Anderson, while possessing some of the functions of the present invention, yet lacks certain important features, most notably the ability to seek alternate routes for completing an emergency 911 call if the selected line is unresponsive. Indeed, in at least his first claim is included the limitating language "...means including said memory for inhibiting said selecting means when said memory has reached its storage capacity and is unable to store additional call identity information..."

Further, Anderson teaches a requirement for two lines to complete any call, one for the caller's voice transmission, and another for the ALI data. His teaching does not include any provision for the current state of the art telephones which use radio frequencies, nor any ability to code a key for use as a "panic button". Another limitation of the Anderson device is the lack of a decoding process to distinguish between a "dial 9" request to a PBX for an outside line, and an emergency 911 call in a situation when every second may count.

The system described by Pankonen et al, hereinafter Pankonen, is for an improved version of an entire PSAP station, instead of simply a complementary device for use therewith and behind PBXs. The title of the patent granted to Pankonen is an "Integrated Public Safety Answering Point System". Pankonen deals with improving the larger system and has no teaching or provision for identifying an individual extension of a PBX.

Similarly, the line status monitoring system of Oliver is a large and sophisticated system for monitoring the status of a great many telephones and reporting the activity of each to a central computer. Very few, if any, of the PBX owners/users targeted by the device of the present invention could afford or justify such an elaborate system. Therefore, such a system, being unaffordable and, thus, uninstalled and unutilized, does not represent a workable solution to the problem addressed by the present invention. Moreover, while the system of Oliver could report various alarm situations, if such a system were installed, the simple act of dialing a nine and two ones to reach a PSAP, especially the PSAP appropriate to the caller, is not addressed in his teaching. Rather, all monitored phone events, which are identified as alarms, go to an associated computer.

DISCLOSURE OF THE INVENTION

Other objects and advantages will be accomplished by the present invention which provides a method of identifying the number of any telephone within a specified geographic area from which a call is originated. The system of the present invention consists of at least one device of the present invention installed at a Public Safety Answering Point, and at least one device of the present invention installed between the PBX of an entity which uses multiple telephone lines and the multiple extension telephones associated with such a PBX.

A device of the present invention, which is designated a Call Interceptor (CI), is comprised of an electronic circuit, similar to a miniature computer. It is intended for installation on, and interfacing with, existing telephone line equipment, such as PBXs, or the like, so as to allow such existing equipment to be compatible with today's 911 and E911 emergency reporting systems. Each such CI device possesses a programmable memory for storing the location and identification data of a plurality of telephones. This device is designed to accommodate a wide variety of equipment and situations. At the calling end of the system, as at a PBX, for instance, the number and location of each individual extension telephone of such PBX, when used to originate a 911 emergency call, will be responsively provided by the CI to certain equipment, preferably another device of the present invention, installed at certain called points, as Public Safety Answering Points, for instance. Another feature of the device of the present invention which can be provided at the calling end is called a Panic Button. The Panic Button can be an existing telephone key which has been programmed to initiate the Panic Button situation. When pressed, the Panic Button initiates an electronic circuit action which simulates the dialing of 911.

When installed at the called end of the system, the CI device will send an interrogating signal to the CI device at the calling end, in order to obtain the number and location information of the telephone at the calling end. The called end CI is also capable of providing ANI and ALI for state of the art devices such as "cordless" telephones and cellular telephones, as well as Telco CO phone lines.

When installed at a PBX, the call interceptor electrically comes between the PBX and its associated extension telephones. Each interceptor device has its own internally stored data base, containing the number and location of every one of the PBX's extensions, or individual telephones in a designated geographic area. When an extension is taken off-hook, it is the call interceptor which first receives the signal. The CI breaks the dial tone and determines from the digits dialed whether the call is a 911 emergency call or not. If it is not, control is passed on to the PBX for normal operation. If the call is a 911 emergency call, the CI causes the PBX to outdial the number of the Public Safety Answering Point (PSAP) which serves the area in which the calling telephone is located. A CI installed at the PSAP processes the call and interrogates the calling CI. The calling CI then responsively identifies, from its internal data base, the extension number and location of the calling extension to the CI at the PSAP, allowing the PSAP operator to direct emergency personnel to that location without delay.

The CI installed at the PSAP is identical to the one installed at the PBX. Although the CIs at both points have internal data bases with which to identify call originating telephones, the CI at the PSAP interrogates and identifies incoming calls. The CI at the PBX, on the other hand, responsively provides identification of outgoing calls when interrogated to do so by the PSAP CI. Also provided is a feature for outdialing preselected alternate route numbers or 1FB lines in case the first dialed number is not responsive.

BRIEF DESCRIPTION OF THE DRAWINGS

The above-mentioned features of the invention will become more clearly understood from the following detailed description when read together with the drawings in which.

FIF. 1 is a simplified diagram representative of the system in which the devices of the present invention can be utilized.

BEST MODE FOR CARRYING OUT THE INVENTION

A device for responsively providing, in cooperative association with the 911 emergency system, the number and location of any telephone, especially including a PBX extension telephone, from which a call originates.

Figure 1:
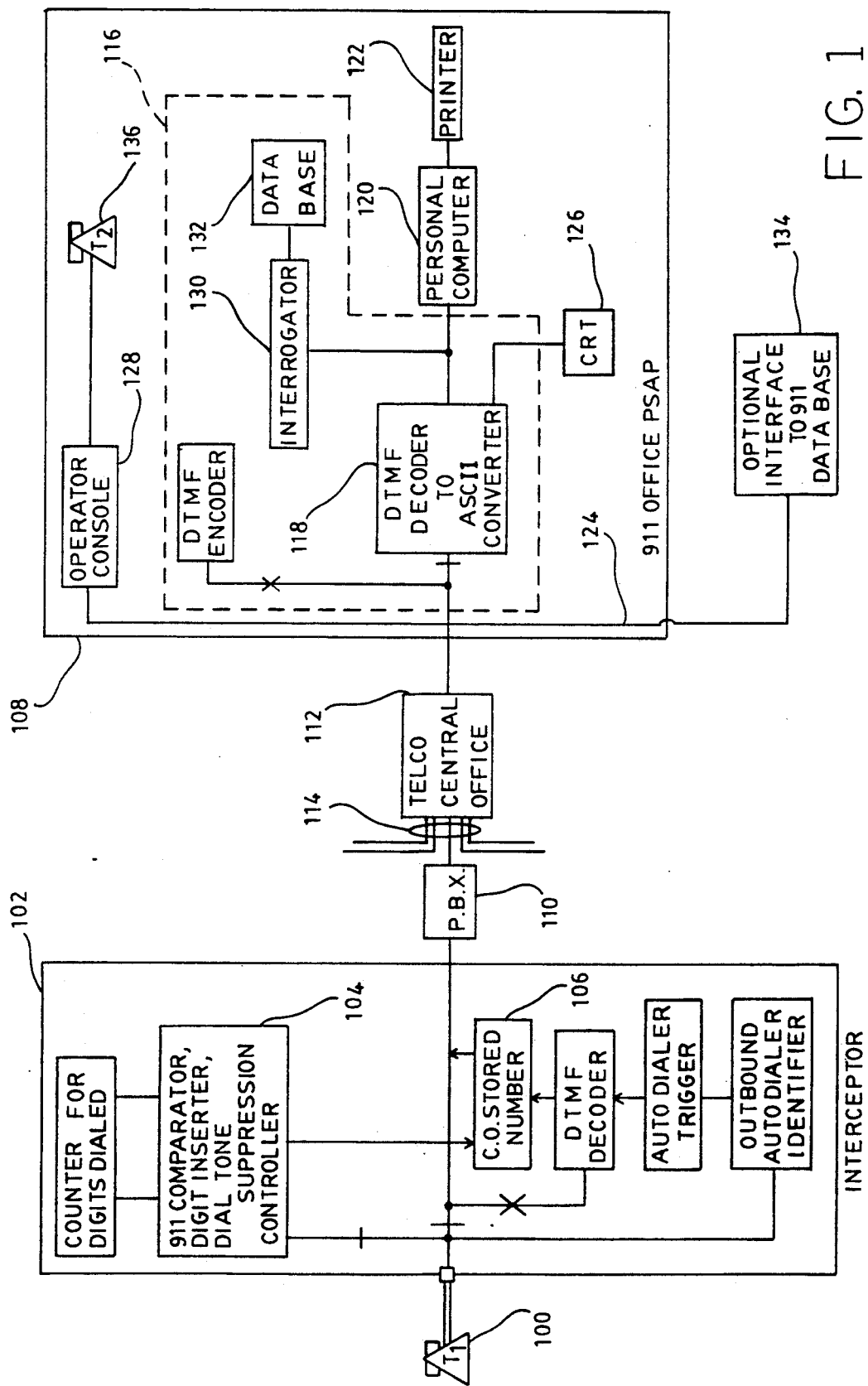

The operation of a system utilizing two devices constructed in accordance with various features of the present invention is illustrated in block diagram form in FIG. 1. A first of two devices of the present invention, designated 102, is installed at a PBX 110. A second such device, designated 116, is installed at a Public Safety Answering Point (PSAP) 108.

When an idle extension telephone 100 is taken off-hook, or if the Panic Button is pressed, the device 102 intercepts the call and, at 104, analyzes the digits dialed If the number dialed is 911, the device 102 causes the PBX 110 to outdial the stored number 106 of the PSAP 108 for that geographic area. If the number is not 911, the device 102 returns control to the PBX 110. In either case, the call goes through the PBX 110 to the Telco Central Office (CO) 112 through a line in one of the trunks 114. From the CO 112, the call goes over the appropriate line to the Public Safety Answering Point 108. Here, the answering point Call Interceptor device 116 processes the call, decoding it at 118 and converting it into American Standard Code for Information Interchange (ASCII). In this form, the call data is routed to a computer 120, a printer 122, a CRT screen 126 installed in the operator's console 128, and the interrogator circuit 130. The interrogator circuit 130 polls the calling CI device 102 for its identifying data and also searches its own data base of information. Optionally patent number, a 911 data base 134 may be utilized for this purpose Because all of this action has taken place at the speed of electronics, the identifying and locating data is ready for display on the CRT 126 of the operator's console 128 when the operator answers the call by taking telephone T2 136 off-hook At this point patent number, the PSAP 108 operator is able to engage the caller in conversation and take whatever action is necessary to deal with the emergency situation The calling telephone can be identified by the device 116 even if it is a "cordless" radio telephone or cellular phone.

To facilitate the use of the device 116 is conjunction with radio frequency-type telephones, i.e., cordless-type and cellular-type telephones, an interface means is provided for accessing the data base of the operating system of the radio frequency-type telephones in similar fashion as that described below. The interface means operates similarly to that used to access the data base of a PBX system as at 51 in FIG. 2, the radio frequency-type telephone system having a data base similar to that of the PBX system as described.

Figure 2:
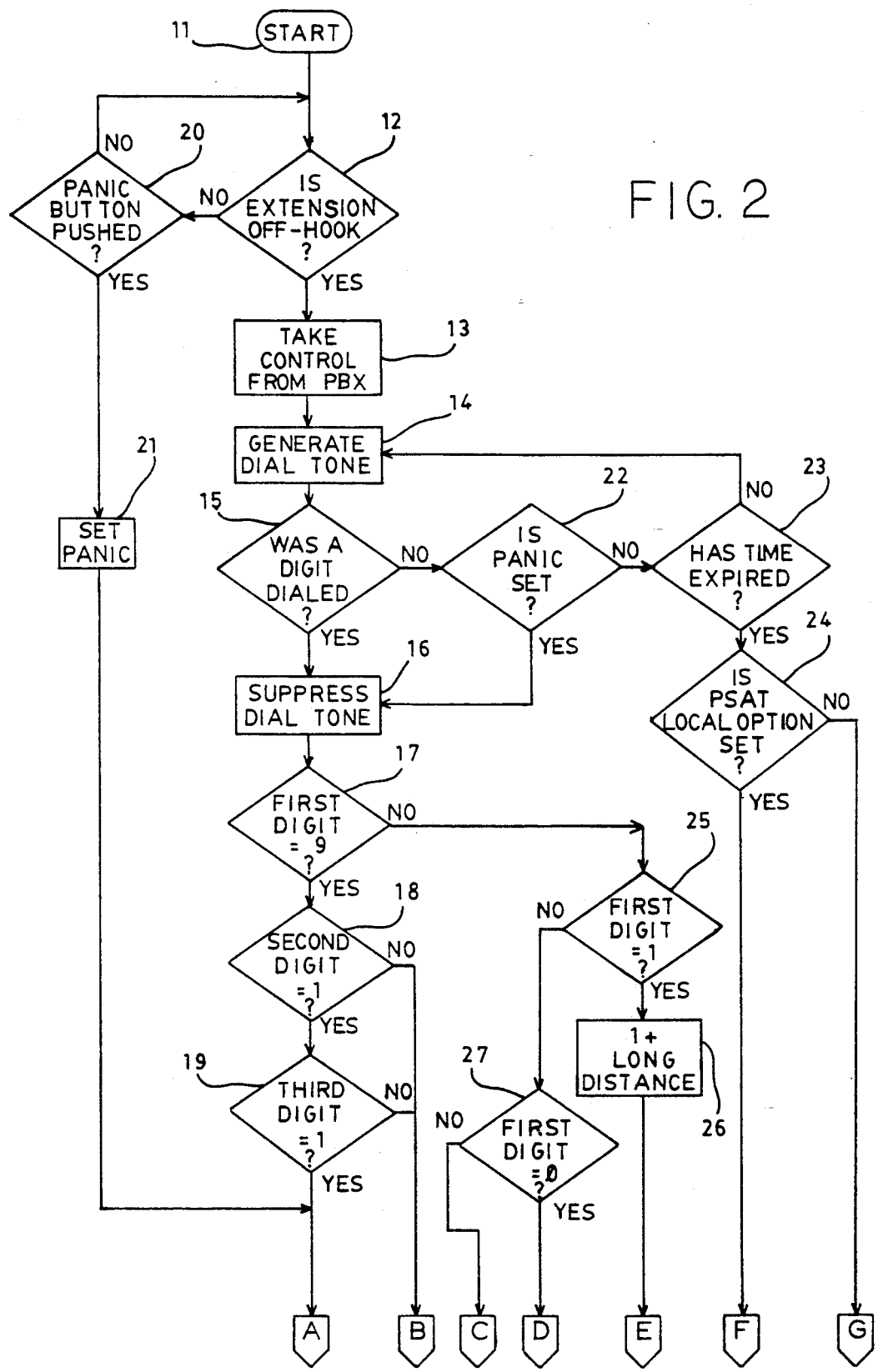
FIG. 2 is a process flow chart diagram of a device of the present invention as installed at a PBX to provide individual identification of an extension telephone from which a call is originated.
Figure 2:
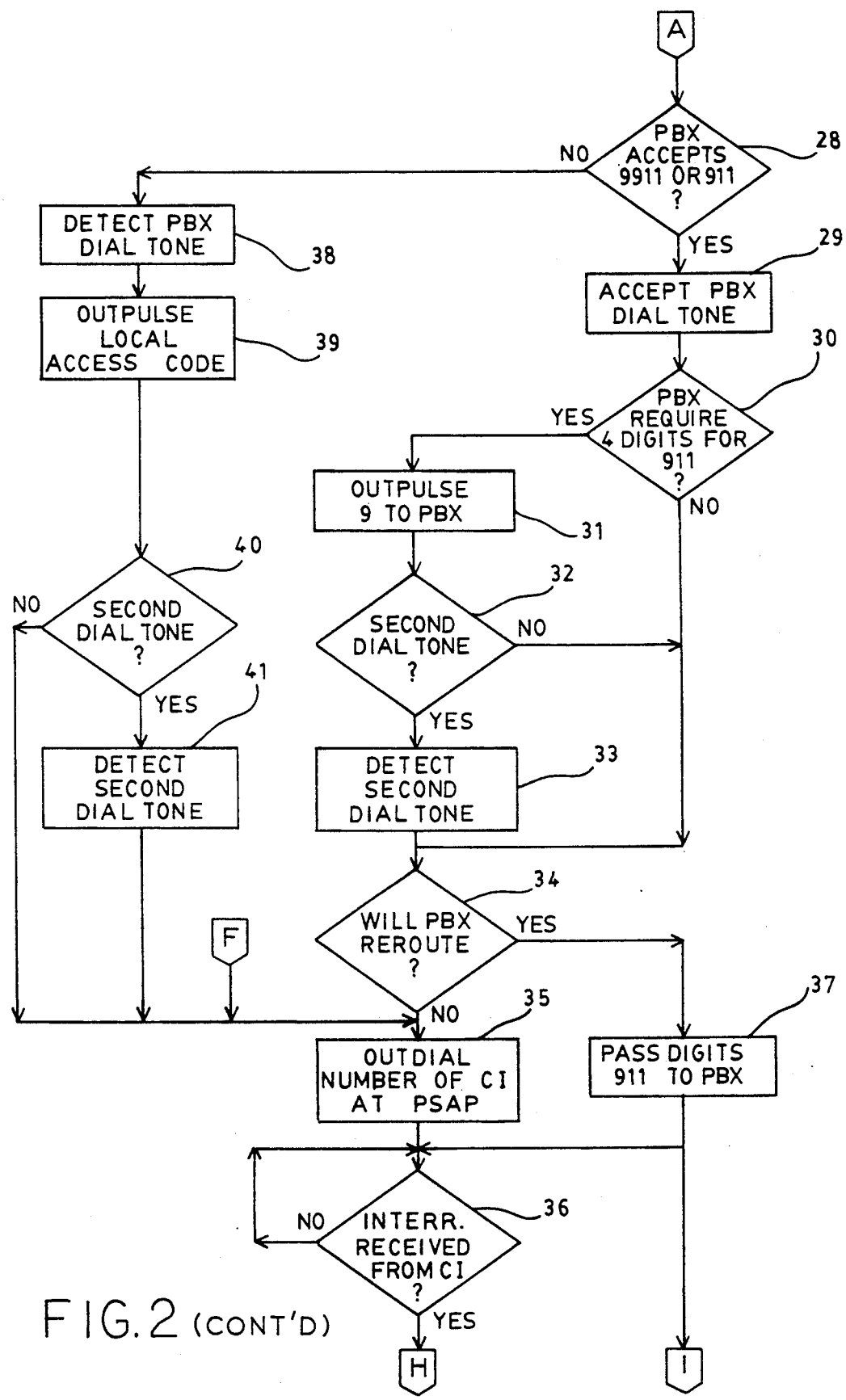
Figure 2:
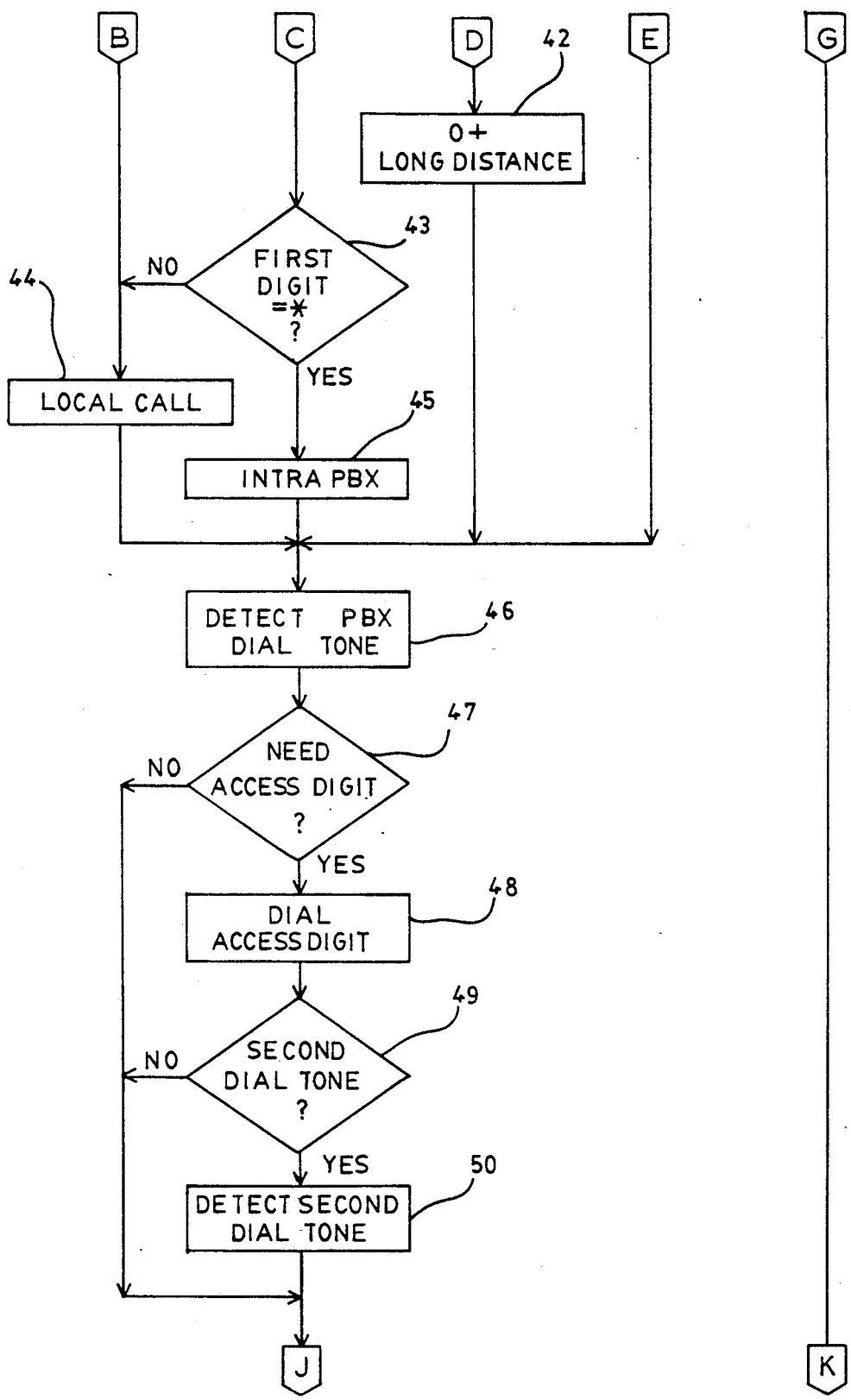
Figure 2:
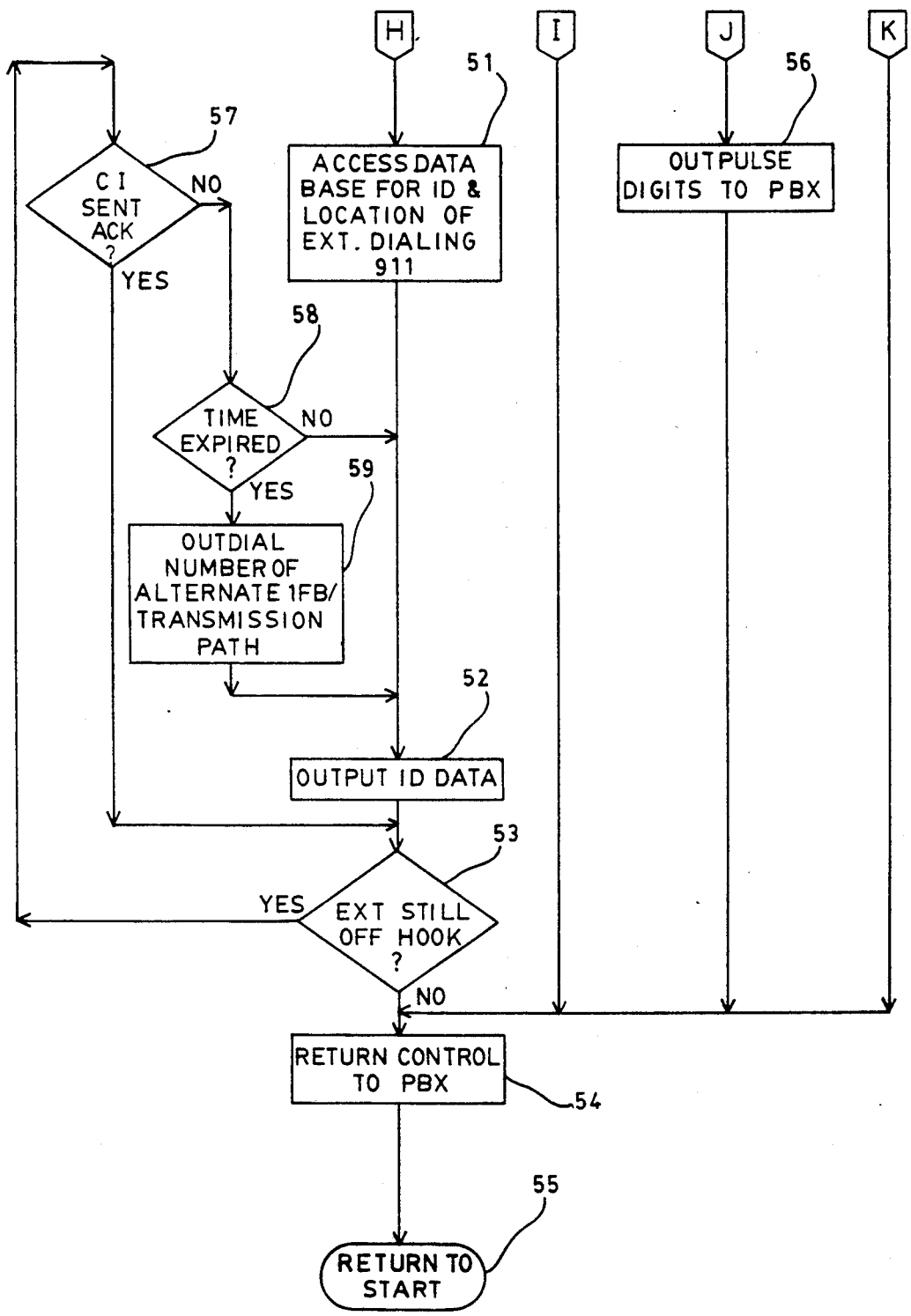

FIG. 2 contains a flow chart diagram giving a more detailed description of the operation of the CI device patent number 102 of the present invention as installed at the PBX 110.

The diagram of the sequence of events begins at START 1 patent number 1, which leads to decision box 12. Decision box 12 indicates that the device 102 is in a waiting loop as long as no PBX extension phone 100 has been taken off-hook and the Panic Button has not been pressed, indicated by the status of decision box 20. When an extension phone 100 is taken off-hook, the answer to the question of decision box 12 becomes YES, so the call interceptor device 102 takes control of the phone lines from the PBX 110 at process box 13 and generates a dial tone at 14. If a digit is dialed, as at 15, the dial tone is suppressed at 16 to indicate that a digit was dialed.

However, at 12 again, the phone 100 need not be taken off-hook if the 911 Panic Button is pushed, making the answer to the question at decision box 20 YES, at which time the device 102 will operate as if 911 had been dialed on a telephone, bypassing stages 12 to 19, and going directly to decision box 28 which is reached by following off-page connector A. Even if the extension phone 100 is taken off-hook, if the Panic Button has been pressed, with the answer to the question at decision box 20 still being YES, the device 102 again will operate as if 911 had been dialed, the only difference being that the dial tone at operation box 16 will be suppressed, as indicated by decision box 22, which is in parallel with the timer decision box at the NO output of decision box 15.

At decision box 15, the device 102 checks to see if a digit has been dialed. Until a digit has been dialed, or the Panic Button has been pressed, the answer to the electronic question at 15 remains NO. This condition activates the timer represented by decision box 23. The timer is also activated by operation of the Panic button, as indicated by decision box 22. Until the expiration of the allotted time, the answer at decision box 22 is also NO, which causes the completion of a loop requiring the continuous generation of the dial tone at 14 while the device 102 continues to check for the dialing of a digit at 15 or having the Panic Button set at process box 21. If a specified time limit, such as one minute, for example, expires without a digit's having been dialed, the answer to decision box 22 becomes YES. At this time, if the PSAP local option at box 24 has not been set, the NO answer allows control to be returned to the PBX 110 at 54, which is shown by following the off-page connector G to K and K to 54. If the PSAP local option has been set at decision box 24, the YES answer leads the process flow, through off-page connector F, to cause the device 102 to outdial the prestored number of the call interceptor device 116 which is installed at the PSAP, as indicated at process box 35.

When a digit is dialed within the allotted time period, the answer to decision box Pat. No.15 becomes YES and the device 102 suppresses the dial tone at 16. At decision box 17, the first digit is examined. If the first digit is not a nine (the answer at decision box 17 is NO), then the call is not an emergency call and the first digit is passed to decision box 25. At decision box 25, the first digit is examined again. If the digit is not a one, making the answer at decision box 25 NO, the call is not a 1+ type long distance call and the first digit is passed on to decision box 27 for further examination. If the digit is a one, then the answer at decision box 25 is YES and the call is a 1+ long distance call, as at process box 26, and the process moves through off-page connector E to process box 46.

If the first digit, as examined at 27, is a zero, the call is identified, through off-page connector D, as being a 0+ long distance call, at box 42, which also leads to process box 46.

If the first digit is not a nine, not a one, and not a zero, the answer at 27 is also NO, and the first digit is examined still again, through off-page connector C, at 43 to see if it is an asterisk, *. If the first digit is not an asterisk, either, the call is determined to be a local call, going to process box 44. It should be noted that the * used here is an arbitrary designation, and the code, instead of an asterisk, can be a single or multiple digit string that allows PBX intra-access. Rules for this operation require that the digit(s) used are not part of the local NNXs. Rotary phones would dial a one- or two-digit string. If the digit at 43 is an asterisk, the call is identified as being an intra-PBX type call, as shown at box 45, which also leads to the function at process box 46.

This selective digit examination and identification function is an important feature of the device of the present invention, and one of the things that set it apart from other devices in this field of endeavor.

Intra PBX calls begin by detecting the PBX dial tone at process box 46, following which a check is made at box 47 to see if a special access digit is needed. If it is, the device 102 dials the access digit at 48, checks for a second dial tone at 49, detects the second dial tone at 50, follows off-page connector J to outpulse the dialed digits to the PBX at 58, and returns control to the PBX at 54. If no special access code is needed, yielding a NO answer at 47, boxes 47 through 50 are bypassed. Similarly, if there is no second dial tone, i.e., a NO answer at 49, then 50 is bypassed.

Back on the first page of the flow chart, if the answer at the output of decision box 17 is YES, meaning that the first digit is a nine, then the device 102 checks at decision box 18 to see if the second digit equals 1. If this answer is YES, the procedure moves to decision box 19 where the third digit is examined. If the answer at 18 or 19 is NO, this call is also a local call, again reaching process box 44, this time through off-page connector B.

However, at decision box 19, if the third digit is a 1, the call is a 911 emergency call and the procedure moves through off-page connector A to decision box 28. If the PBX 110 at which a particular CI device 102 is installed requires that an access digit be dialed Pat. No.(such as 9, for instance, for an outside line), then a total of four digits would be required to obtain 911 (9911). If the answer at decision box 28 is YES, a customization feature of the device 102, allowing the device 102 to be used with various models of PBX 110, is activated. PBX dial tone is detected at process box 29 and, at 30, if four digits are required, the process beginning at box 31 is initiated. Following the outpulsing of a digit 9 at 31, the device 102 checks for a second dial tone at 32. If there is one, the dial tone is detected at 33 and, whether there is a second dial tone or not, and also for PBXs of the three-digit type, at the output of decision box 30, the procedure flow moves to decision box 34. If the PBX will not reroute the 911 call at 34, the next step in the process will be box 35.

However, before following the process any further in this path, it is necessary to return to box 28. If the answer to decision box 28 is NO, the PBX dial tone is detected at process box 38 and a local access code is outpulsed at box 39, following which the presence of a second dial tone is checked for at 40. If one is present, it is detected at 41 and, whether a second dial tone was present or not, the procedure again moves to process box 35.

At 34, if the PBX 110 will reroute the outgoing 911 call so as to allow the CI device 102 to provide ID and location data to the interrogating device 116, the answer is YES and the digits 911 are passed to the PBX Pat. No.110 at 37, with control returned at 54, which can be seen by following off-page connector I. Note that, for both the passing of the digits 911 at box 37 and the outdialing of the number of the device 116 installed at the PSAP, the device 102 checks at 36 for an interrogating signal to be received from the device 116.

If the PBX 110 will not reroute the call, the answer at 34 is NO and the next step in the sequence is to perform the OUTDIAL command at 35. Then, at 36, having dialed the number of the PSAP at box 35, the device 102 is in a loop awaiting interrogation from the CI 116 installed at the PSAP 108. When the interrogation is received and the answer at 36 becomes YES, following off-page connector H, the device 102 accesses its data base at 51 for the identification and location data of the extension telephone 100 which was used to dial 911, and transmits this data at 52 to the interrogating device 116. At 53, as long as the extension 100 remains off-hook, the device 102 checks at 57 to see if an acknowledging signal (ACK) has been received. If not, and as long as a second timer at 58 has not timed out, the device continues to output ID data at 52. When ACK has been received, the YES at 57 stops the repetition of ID data. If ACK has not been received and a second timer has timed out (a YES at 58), the device 102 dials an alternate route or IFB line at 59 for the 911 call. This is an important feature of the device of the present invention. Prior art devices have no provision for selecting alternate routes if a connection at the dialed number cannot be accomplished. When the extension 100 has been hung up, the answer at 53 becomes NO, and control is returned to the PBX 110 at 54. When this occurs, the device is reset, as at 55, "Return to Start."

Thus, it will be seen by those skilled in the art that the CI device 102 not only allows the dialing of 911 for emergencies, but also allows the user to dial local and long distance calls as if a resident telephone were being used. This is an inherent operation of the CI 102.

Figure 3:
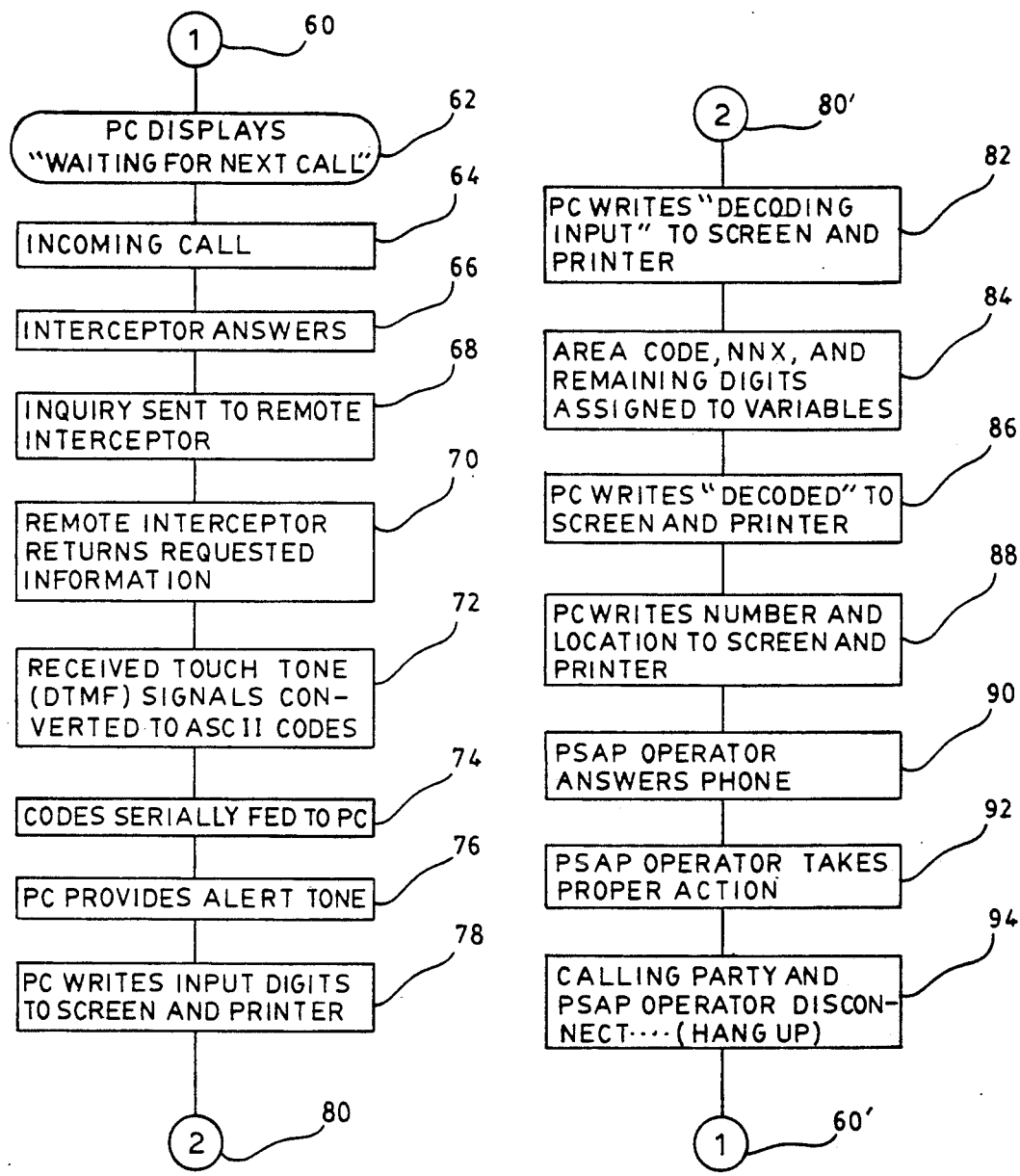
FIG. 3 is a simplified block flow diagram of a system utilizing a device of the present invention designed for installation at the called point (PSAP).

After 911 has been dialed and the PBX 110, at 35, has outdialed the number for the area PSAP 108, the sequence of events at the PSAP 108, as diagrammed in FIG. 3, begins at 60 with the Personal Computer 120 generating the legend "Waiting for next call," 62, on the CRT screen of the operator's console 128. At 64, an incoming call is received by CI 116, at 66. At 68, CI 116 transmits a polling signal to (interrogates) the calling CI, 102. At 70, the calling CI 102 responsively returns the information identifying the telephone 100 originating the call. At 72, the Dual Tone Modulating Frequency (DTMF) signals received from the calling CI 102 are converted to ASCII signals The ASCII coded signals are fed at 74 to the Personal Computer 120, which generates an Alert Tone at 76. At 78, the computer 120 then writes on the CRT 126 screen and the printer 122, the number of the telephone 100 from which the incoming call originated.

The flow of the diagram next moves from 78 to 80 to 80' and 82, where the computer 120 writes "Decoding Input" to the screen 126 and printer 122 of the operator at the PSA 108. At 84, the area code, exchange ("NNX"), and individual telephone number digits ("remaining digits") are assigned to variable storage names and locations in the memory of computer 120. At 86, the computer 120 next writes "Decoded" to the screen, 126, and the printer, 122, followed by the number and location, 88, of the telephone 100 making the incoming call, together with the date and time at which the call is being made.

At 90, the PSAP operator answers the telephone 136 and, at 92, initiates the required actions to deal with the incoming emergency call. As long as the calling telephone 100 remains off-hook, the location and identification information about that telephone continues to be supplied to the device 116 at the PSAP.

At the conclusion of the situation, both parties hang up and conditions at the PSAP return to standby, 60' and 60 in the diagram.

From the foregoing detailed description, it can be seen that a device capable of supplying the identifying number and location of telephones initiating a 911 emergency call, especially PBX extension telephones, has been described. While features of a preferred embodiment have been mentioned in connection with the disclosure of the present invention, it will be understood that no intent has been made to limit the invention to such disclosure, but rather the intention of such disclosure has been to cover all modifications and alternate constructions falling within the spirit and scope of the invention as defined in the appended claims.

Accordingly, this invention is limited only by the claims appended hereto, and their equivalents, when taken in combination with the complete description contained herein.

I claim:

1. A device, having a data base of information stored in an internal memory, for use as an adjunct to an existing telephone switching and control system and for responsively providing, to 911 and enhanced 911 emergency systems, selected extension identifying information which includes at least the number and location of an extension telephone of said telephone system from which a call comprised of the three digits 911 originates, said device comprising:

sensing means for sensing an off-hook condition of any of a plurality of extension telephones of said telephone system;

detecting means for detecting dialing signals from said extension telephones of said telephone system, whether or not said extension telephones are in said off-hook condition;

selectable responding means for responding to the pressing of a selected single key of said extension telephones as a designated "Panic Button", alternate means of generating a 911 emergency call, said alternate call generating means being functional without the need for taking said extension telephone off-hook;

identification means for determining whether or to said dialing signals from said extension telephones comprise an emergency 911 call, and whether or not said dialing signals were generated by said selected key of said extension telephones as an alternate, "Panic Button" method for dialing said emergency call;

dial tone processing means for detecting, generating, and suppressing at least one dial tone;

memory access means for selectively retrieving and transmitting selected items from said data base of information in response to a finding by said identification means that said call is a 911 emergency call, and appropriate externally generated interrogation signals;

telephone system conformation means for causing said device to modify selected functions thereof in order to conform to selected functions of said telephone system at which said device is installed, aid selected functions of said telephone system including a need for dialing an access code consisting of at least one digit to access an outside line of said phone system in order to dial 911, and the inability of said telephone system to reroute said 911 calls;

interface means for interfacing with computers, conventional telephones, telephone lines and circuits; and automatic rerouting means for automatically dialing alternate destination telephone numbers and automatically selecting alternate telephone lines over which to transmit information in case of apparent failure of initially selected route.

2. The device of claim 1 wherein said interface means further interfaces with radio frequency-type telephones within a selected radio-type telephone operating system.

3. A system of at least two devices, having electronic memories and data bases, for selectively supplying the identifying number and location of a calling extension telephone of a PBX via a first device of the present invention, installed at said PBX, to a second device installed in cooperative association with a selected called telephone, comprising the steps of:

detecting the dialing by a calling PBX extension telephone of the digits 911;

in response to said detection of the dialing of the digits 911, the outdialing of a preselected number stored in said electronic memory;

the selecting of alternate process steps for PBXs requiring four digits for 911, and which do not reroute said 911 calls;

the detecting of a responsive interrogating signal from said second device;

upon detection of said interrogating signal, the accessing of said data base and the transmitting of selected items of data stored therein to said interrogating device; and the automatic selecting of an alternate telephone line and the automatic outdialing of an alternate telephone number in case of failures to detect said interrogating signal.

4. A device having an internal memory for storing selected telephone extension identification information, said device for use as an adjunct to an existing telephone system and for responsively providing said selected telephone extension identifying information to emergency telephone systems, said selected telephone extension identifying information including at least the number and location of an extension telephone of said telephone system from which an emergency call originates, said device comprising:

sensing means for sensing an off-hook condition of any of a plurality of said extension telephones of said telephone system;

extension telephone identifying means for identifying which of said plurality of extension telephones has originated said emergency call;

telephone system conformation means for causing said device to modify selected functions thereof in order to conform to selected functions of said telephone system at which said device is installed; and automatic rerouting means for automatically dialing alternate destination telephone numbers and automatically selecting alternate telephone lines over which to transmit information.

5. The device of claim 4 wherein said extension telephone identifying means includes:

detecting means for detecting signals originating from any of said plurality of extension telephones of said telephone system, said detecting means operating independently of said sensing means;

identification means for determining if said signals detected by said detecting means constitute said emergency call;

dial tone processing means for detecting, generating, and suppressing at least one dial tone;

memory access means for selectively retrieving and transmitting selected items from said internal memory upon said origination of said emergency call and in response to appropriate externally generated interrogation signals; and interface means for interfacing with computers, telephones, telephone lines and circuits.

6. The device of claim 5 wherein said interface means further interfaces with radio frequency-type telephones within a selected radio-type telephone operating system.

7. The device of claim 5 further comprising a call receiving means for processing said call received by said emergency telephone system, said call receiving means comprising:

detection means for detecting said emergency telephone call arriving at an input circuit of said call receiving means;

interrogation means for interrogating said extension telephone identifying means and for receiving said selected data transmitted from said internal memory of said device upon said origination of said emergency call;

emergency telephone system internal memory means for storing selected telephone system data;

means for selectively accessing said emergency telephone system internal memory means; and interface means for interfacing with computers, telephones, telephone lines and circuits.

8. The device of claim 7 wherein said call receiving means further comprises control signal generating means for generating control signals and routing said control signals to at least one data output device.

9. The device of claim 8 wherein said data output device is a computer having at least one selected output display medium.

10. The device of claim 4 further comprising:

alternate call generating means for generating said emergency call by pressing a selected single key of said extension telephone, said alternate call generating means operating independently of said sensing means; and call method identification means for determining if said selectable alternate call generating means has been activated to originate said emergency call.

11. The device of claim 10 wherein said extension telephone identifying means includes:

detecting means for detecting signals originating from any of said plurality of extension telephones of said telephone system, said detecting means operating independently of said sensing means;

identification means for determining if said signals detected by said detecting means constitute said emergency call;

dial tone processing means for detecting, generating, and suppressing at least one dial tone;

memory access means for selectively retrieving and transmitting selected items from said internal memory upon said origination of said emergency call and in response to appropriate externally generated interrogation signals; and interface means for interfacing with computers, telephones, telephone lines and circuits.

12. The device of claim 10 wherein said interface means further interfaces with radio frequency-type telephones within a selected radio-type telephone operating system.

13. The device of claim 10 further comprising a call receiving means for processing said call received by said emergency telephone system, said call receiving means comprising:

detection means for detecting said emergency telephone call arriving at an input circuit of said call receiving means;

interrogation means for interrogating said extension telephone identifying means and for receiving said selected data transmitted from said internal memory of said device upon said origination of said emergency call;

emergency telephone system internal memory means for storing selected telephone system data;

means for selectively accessing said emergency telephone system internal memory means; and interface means for interfacing with computers, telephones, telephone lines and circuits.

14. The device of claim 13 wherein said call receiving means further comprises control signal generating means for generating control signals and routing said control signals to at least one data output device.

15. The device of claim 4 wherein said data output device is a computer having at least one selected output display medium.

* * * * *